R. A. BARRETT.
GUANO-DISTRIBUTER.
No. 172,374.  Patented Jan. 18, 1876.
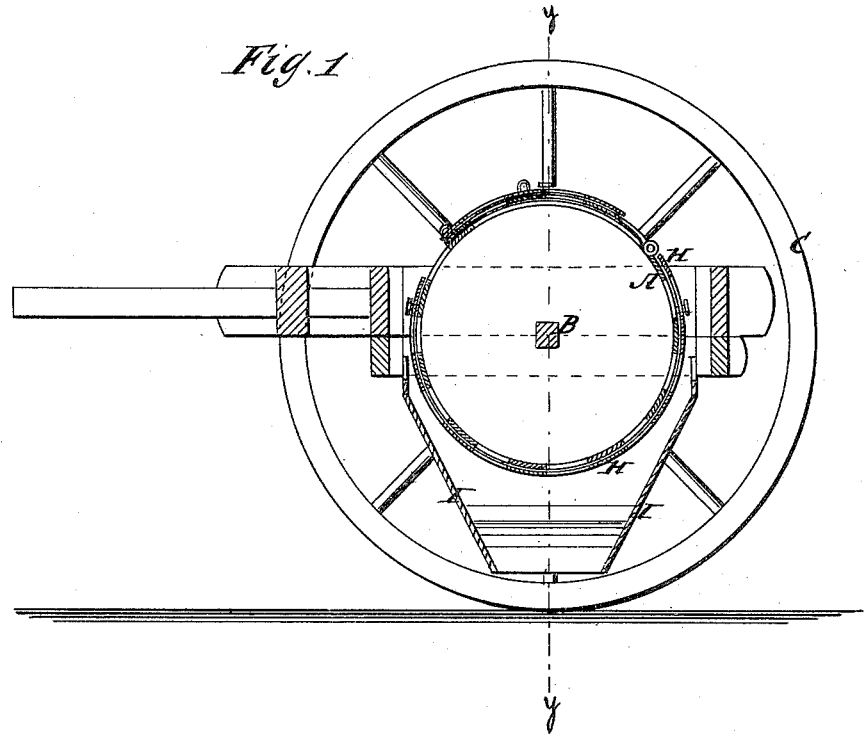
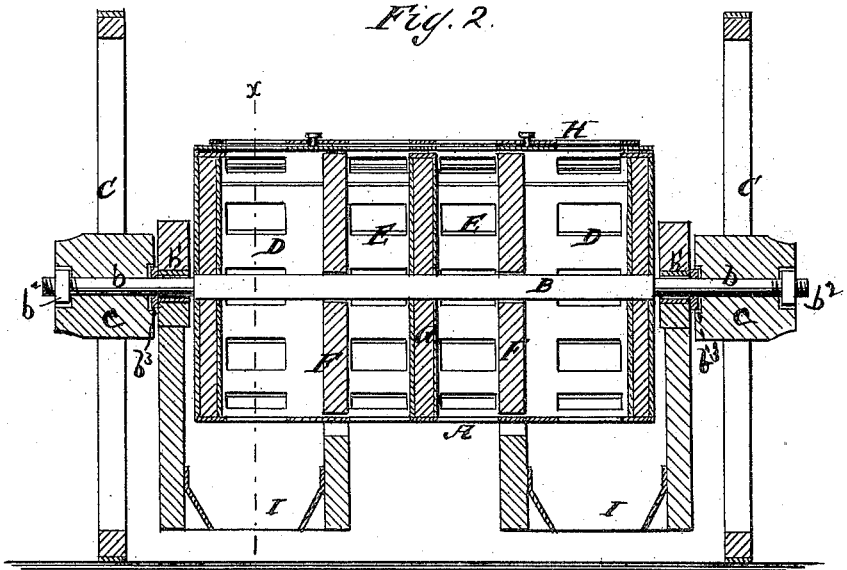
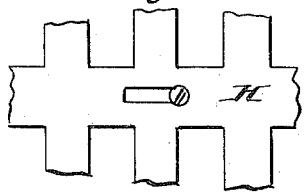
WITNESSES:
E. Wolff.
Alex F. Roberts
INVENTOR:
R. A. Barrett
BY
ATTORNEYS.

UNITED STATES PATENT OFFICE.

RICHARD A. BARRETT, OF NEWSOME'S DEPOT, VIRGINIA.

IMPROVEMENT IN GUANO-DISTRIBUTERS.

Specification forming part of Letters Patent No. 172,374, dated January 18, 1876; application filed October 8, 1875.

*To all whom it may concern:*

Be it known that I, RICHARD A. BARRETT, of Newsome's Depot, Southampton county, Virginia, have invented a new and Improved Guano-Distributer, of which the following is a specification:

The invention consists in combining with the distributing-cylinder an axle having long journals, frame-bearings, flanges, and nuts, as hereinafter more fully described.

Figure 1 is a sectional elevation of my improved guano-distributer, taken on the line $x$ $x$ of Fig. 2. Fig. 2 is a section on line $y$ $y$ of Fig. 1, and Fig. 3 is a detail of the regulator.

Similar letters of reference indicate corresponding parts.

A represents the hollow perforated drum for containing and distributing the guano. It is mounted on the axle B of the truck-wheels C, and is divided into four compartments, D D and E E, by partitions F F and G. Around the exterior of the shell is a perforated jacket, H, of thin metal or other material, capable of sliding a little to vary the extent of the openings in the drum, to regulate the quantity discharged, and under the compartments D are hopper-spouts I, for discharging the guano in rows, in which case the compartments E will not be filled, these being only to be used when the ground is to be sown broadcast.

The end-threaded axle B has long journals $b$, that have bearings $b^1$ in the frame, as well as in the wheel, so that they may revolve either in or with the wheels. When the nuts $b^2$ are screwed up or clamped to the hubs $c$, the distributing-cylinder is compelled to turn with the axle; but when the nuts are loosened the weight of the distributer will hold the axle still while the wheels revolve upon its journals.

What I claim as new is—

The combination of distributing-cylinder A, axle B, having long journals $b$, frame-bearings $b^1$, and flanges $b^3$, and the nuts $b^2$, substantially as and for the purpose specified.

R. A. BARRETT.

Witnesses:
JOHN W. BEATON,
WM. M. BEATON.